United States Patent [19]
Artemiev et al.

[11] 4,147,588
[45] Apr. 3, 1979

[54] FAST REACTOR RECHARGING DEVICE

[76] Inventors: Lev N. Artemiev, ulitsa Berezovskaya, 89, kv. 94; Vitaly V. Kurilkin, ulista Shalyapina, 15, kv. 14, both of Gorky, U.S.S.R.

[21] Appl. No.: 796,602

[22] Filed: May 13, 1977

[51] Int. Cl.² ..................... G21C 19/20; B66C 17/08
[52] U.S. Cl. ..................................... 176/30; 414/146
[58] Field of Search ............... 176/30, 31, 32, 36 C; 214/18 N

[56] References Cited
U.S. PATENT DOCUMENTS

| | | | |
|---|---|---|---|
| 2,894,779 | 7/1959 | Kushner | 176/36 C |
| 3,337,257 | 8/1967 | Brynsvold | 176/30 |
| 3,629,069 | 12/1971 | Wright | 176/30 |
| 3,690,713 | 9/1972 | Ristow | 176/30 |
| 3,768,668 | 10/1973 | Schukei | 176/30 |
| 3,857,599 | 12/1974 | Jones | 176/36 C |
| 3,950,020 | 4/1976 | Hoffmeister | 176/30 |
| 3,994,775 | 11/1976 | Spurrier | 176/30 |
| 4,069,098 | 1/1978 | Wade | 176/30 |
| 4,073,684 | 2/1978 | Cepkauskas | 176/36 C |

*Primary Examiner*—Stephen C. Bentley
*Assistant Examiner*—Donald P. Walsh
*Attorney, Agent, or Firm*—Fleit & Jacobson

[57] ABSTRACT

Disclosure is made of a device for recharging a fast-neutron reactor, intended for the transfer of fuel assemblies and rods of the control and safety system, having profiled heads to be gripped on the outside. The device comprises storage drums whose compartments for rods of the control and safety system are identical to compartments for fuel assemblies. In order to store and transport rods of the control and safety system from the storage drums to the recharging mechanism provision is made for sleeve-type holders. When placed in such a holder, the dimensions of a rod of the control and safety system are equal to those of a fuel assembly. To join a holder to a rod of the control and safety system, on the open end of each holder there is mounted a collet, whereas on the surface of each rod of the control and safety system, close to its head, there is provided an encircling groove to interact with the collet. The grip of the recharging mechanism is provided with a stop interacting with the collet in order to open the latter and withdraw the safety and control system rod from its holder.

2 Claims, 6 Drawing Figures

FAST REACTOR RECHARGING DEVICE

The present invention relates to nuclear reactor recharging devices and, more particularly, to recharging devices for fast-neutron reactor with liquid metal coolant, wherein the replacement of spent fuel assemblies and rods of the control and safety system is carried out under conditions when the reactor is stopped, all the recharging operations are shielded, and the core circuit remains sealed.

There is known a nuclear reactor recharging device comprising a separate mechanism for replacing fuel assemblies, and a separate mechanism for replacing rods of the control and safety system. The use of two separate mechanisms is due to substantial differences in the configuration and size of the fuel assemblies and rods of the control and safety system.

In this specific case, the rods of the control and safety system are round, whereas the fuel assemblies are hexahedral and have a greater length and diameter.

There is also a French device, known as Super Phoenix, for recharging fast reactors. In this device, fuel assemblies and rods of the control and safety system are handled by one mechanism. The rods are placed in cartridges so that both make up an assembly similar to a fuel assembly.

The latter technical solution envisages the use of special end members for fuel assemblies, rods of the control and safety system, and cartridges. These end members are hollow cylinder-shaped heads with an internal groove to interact with the grip of the recharging mechanism. The device under review is not applicable to nuclear reactors, wherein the recharging mechanism has a grip to interact with profiled heads of fueld assemblies and rods of the control and safety system, which heads are gripped on the outside.

However, there is a large group of nuclear reactors whose recharging mechanisms interact with profiled heads of core elements, which are gripped on the outside, because this type of gripping is the most effective.

Besides, at present, use is made of a device for recharging a fast-neutron reactor, comprising a storage drum with compartments for new fuel assemblies and rods of the control and safety system, a mechanism for transferring fuel assemblies and rods from the storage drum to a recharging mechanism having a grip to interact with profiled heads of fuel assemblies and rods of the control and safety system to be gripped on the outside, and place new fuel assemblies and rods in the reactor's core and remove spent fuel assemblies and rods therefrom into a storage drum which receives spent fuel assemblies and rods removed by the recharging mechanism from the reactor's core and transferred by the transfer mechanism.

In this recharging device, the compartments for rods of the control and safety system are different in shape from the compartments for fuel assemblies, which is due to differences in the dimensions of the rods and fuel assemblies.

If rods of the control and safety system are placed by mistake in compartments for fuel assemblies, these rods are out of reach of the recharging mechanism and cannot be withdrawn from the compartments.

In order to avoid accidents and damage of recharging mechanisms, the program control system of the recharging device must be designed to rule out placing of rods of the control and safety system in the compartments intended for fuel assemblies, and vice versa. For this purpose, program control systems for controlling recharging devices of known types envisage interlocking to prevent grips with fuel assemblies from approacing compartments in the storage drum intended for rods of the control and safety system, and vice versa.

Besides, the presence of special compartments in the storage drum complicates the design and increases the size of the drum.

Obviously, the foregoing design of the recharging device is too complicated; on the other hand, it is not reliable enough and does not rule out accidents in the course of recharging.

It is the main object of the present invention to provide a recharging device for a fast-neutron reactor, intended for recharging fuel assemblies and rods of the control and safety system with profiled heads, and having a single mechanism for the transfer of fuel assemblies and rods of the control and safety system.

It is another object of the present invention to raise the reliability of the recharging process and reduce the recharging time.

The foregoing objects are attained by providing a recharging device for a fast-neutron reactor, comprising a storage drum with compartments for new fuel assemblies and rods of the control and safety system, a mechanism for transferring fuel assemblies and rods of the control and safety system from the storage drum to a recharging mechanism having a grip intended to interact with profiled heads of fuel assemblies and rods of the control and safety system to be gripped on the outside, as well as to place new rods and fuel assemblies in the reactor's core and remove spent ones therefrom and a storage drum for spent fuel assemblies and rods of the control and safety system, removed from the reactor's core and received by this second drum from the transfer mechanism, in which device the compartments of the storage drums for rods of the control and safety system are identical in accordance with the invention, with the compartments for fuel assemblies, the rods of the control and safety system being stored and transported from the storage drums to the recharging mechanism in sleeve-type holders, so that when placed in such holders, the dimensions of the rods of the control and safety system are equal to those of the fuel assemblies, the joining of each sleeve-type holder with a respective rod being effected with the aid of a collet provided on the open end of each holder, on the surface of each rod, near its head, there being provided an encircling groove to interact with the collet, the grip of the recharging mechanism being provided with a stop to interact with the internal surface of the collet to open the latter and release the rod of the control and safety system from the holder under the action of a spring arranged in the holder.

The recharging device of this invention makes it possible to replace both fuel assemblies and rods of the control and safety system with the aid of the same mechanisms; the device is simple in design and rules out accidents due to placing rods of the control and safety system into compartments intended for fuel assemblies and vice versa.

Other objects and advantages of the present invention will become more apparent from the following detailed description of a preferred embodiment thereof to be read in conjunction with the accompanying drawings, wherein.

Figure 1:
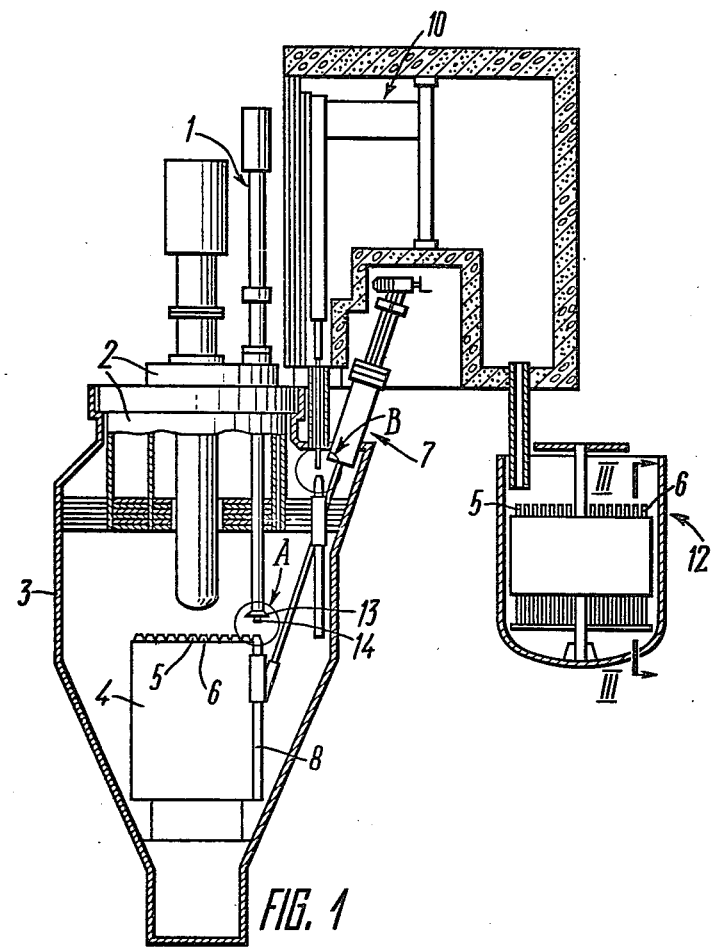
FIG. 1 is a schematic elevation view of a device for recharging a fast-neutron reactor, in accordance with the invention.
Figure 2:
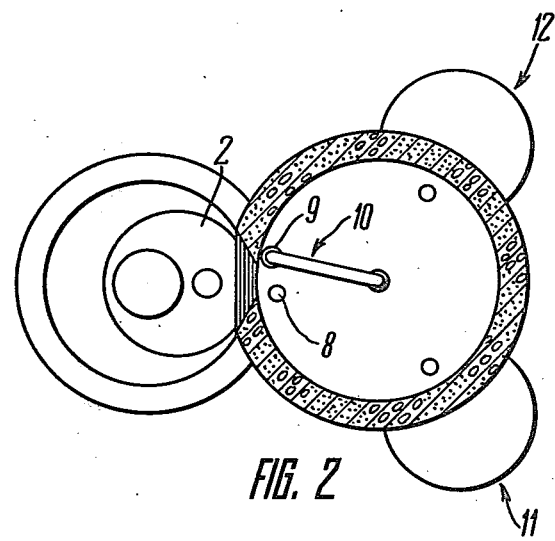
FIG. 2 is a plan view of the device of FIG. 1.

Referring now to the attached drawings, the proposed recharging device for a fast-neutron reactor, shown in FIGS. 1 and 2, comprises a recharging mechanism 1 installed in rotating plugs 2 which are rotatable around their axes in a nuclear reactor vessel 3 above a reactor core 4. The device further includes a mechanism for transferring fuel assemblies 5 and rods 6 of the control and safety system.

Elsewhere in this text, when mention is made of the fuel assemblies 5 and rods 6 in conjunction, these will be referred to as "assemblies" for reasons of brevity.

The assembly transfer mechanism comprises an elevator 7 with a charging socket 8 and a recharging socket 9, and an assembly handling mechanism 10. The proposed device also includes a storage drum 11 for new assemblies and a storage drum 12 for spent assemblies. The recharging mechanism 1 has a grip 13 which terminates in a stop 14.

Figure 3:
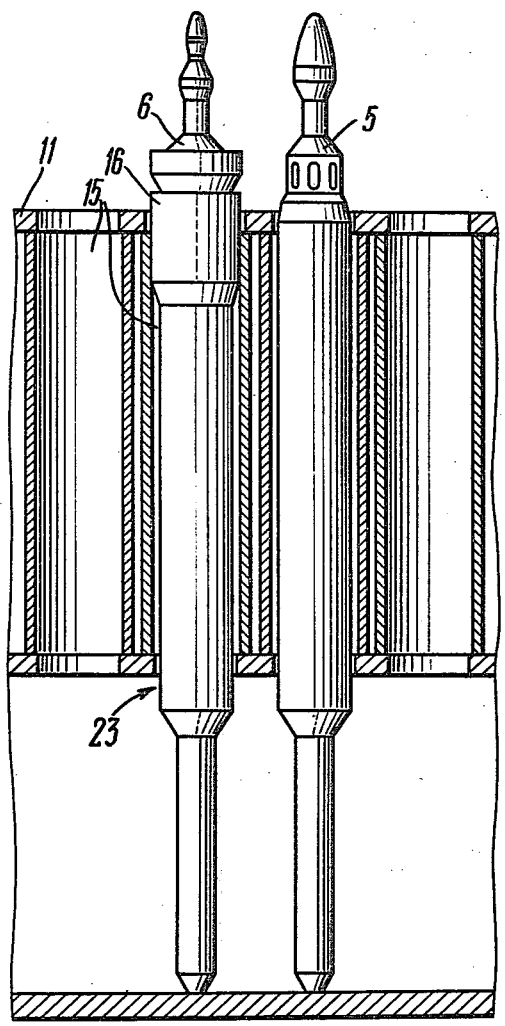
FIG. 3 is a magnified sectional view taken on line III—III of FIG. 1.

FIG. 3 is a sectional view taken on line III—III of FIG. 1 and shows compartments 15 in the storage drum 11, which are all identical and intended to receive assemblies. A rod 6 of the control and safety system is placed in a sleeve-type holder 16, so that its overall dimensions are equal to those of the fuel assembly 5.

Figure 4:
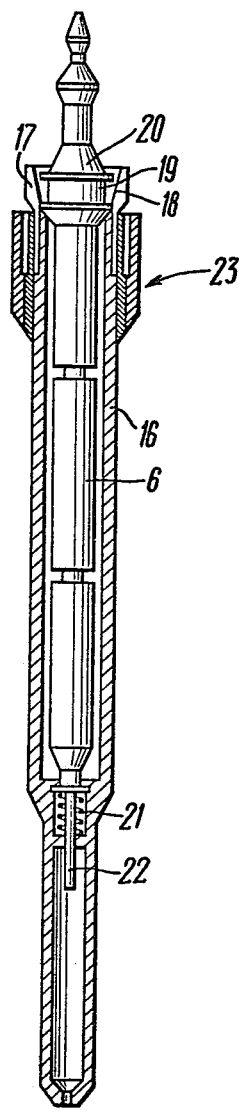
FIG. 4 is an elevation view of a rod of the control and safety system and a holder, in accordance with the invention.

FIG. 4 is an elevation view of a rod 6 of the control and safety system, placed in the holder 16 which in its upper portion is provided with a collet 17 having a cone-shaped inner surface 18. The collet 17 interacts with an encircling groove 19 provided on the surface of the rod 6, near its profiled head 20.

Between the bottom of the holder 16 and the end face of the rod 6, there is arranged a spring 21 with a pusher 22, intended to push the rod 6 from the holder 16 during a recharging operation. When placed in the holder 16, the rod 6 is referred to as an assembly 23.

Figure 5:
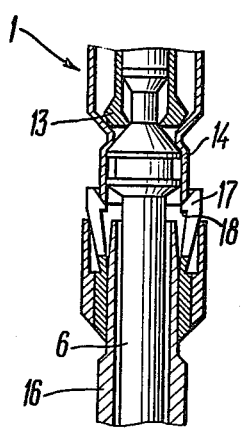
FIG. 5 is a magnified view of the unit A of FIG. 1.

FIG. 5 is a view of the unit A of FIG. 1, taken at a moment when the new rod 6 is disengaged from the holder due to the interaction of the stop 14, protruding from the grip 13 of the mechanism 1, with the cone-shaped surface of the collet 17 of the holder 16.

Figure 6:
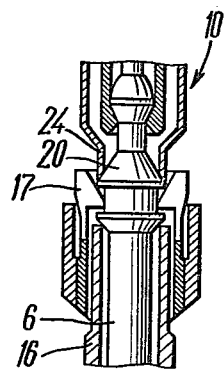
FIG. 6 is a magnified view of the unit B of FIG. 1.

FIG. 6 is a view of the unit B of FIG. 1, taken at a moment when the spent rod 6 is engaged with the holder 16 due to the interaction of a grip body 24 of the mechanism 10 with the profiled head 20 of the rod 6.

The proposed device for recharging a fast-neutron reactor operates as follows.

Prior to the recharging, a new rod 6 (FIG. 4) of the control and safety system is placed in the sleeve-type holder 16; the collet 17 is received in the encircling groove 19, making up the assembly 23 which is inserted into any compartment 15 (FIG. 3) of the storage drum 11 (FIG. 2) for new assemblies, adjacent to the new fuel assemblies 5 placed in the similar compartments 15.

The rotor of the storage drum 11 for new assemblies is set into rotation, and one of the compartments 15 (FIG. 3), holding the assembly 23, is matched with the axis of the mechanism 10 (FIGS. 1 and 2). The latter extracts the assembly 23, transfers it and places it in the charging socket 8 of the elevator 7. The latter transfers the assembly 23 received in the socket 8 to the periphery of the reactor core 4. By rotating the plugs 2, the mechanism 1 is matched with the axis of the socket 8 which holds the assembly 23. The cone-shaped surface of the stop 14 protruding from the grip 13 of the mechanism 1 slides over the cone-shaped surface 18 of the jaws of the collet 17, unclamps the latter and disengages it from the encircling groove 19 provided on the surface of the rod 6, near its profiled head 20.

At the same time the pusher 22 pushes the rod 6 upwards under the action of the spring 21, until the collet 17 leaves the encircling groove 19. The grip 13 of the mechanism 1 grips the profiled head 20 on the outside and withdraws the new rod 6 from the holder 16. As this takes place, the holder 16 remains in the socket 8 of the elevator 7. After this, by rotating the plugs 2, the mechanism 1 with the new rod 6 clamped in the grip 13 is directed at the transfer socket (not shown) provided in the screen of the core 4, wherein there is temporarily placed the new rod 6. The rotating plugs 2 then point the mechanism 1 at the spent rod 6 in the core 4, which is to be replaced. The latter rod 6 is removed with the aid of the grip 13 and transferred to the holder 16 found at this time in the socket 8 of the elevator 7.

From its temporary storage place in the socket in the screen of the core 4, the new rod 6 is placed, with the aid of the rotating plugs 2 and the mechanism 1, in the vacated socket of the core 4, wherefrom the spent rod 6 has been just removed. The elevator 7 then moves the socket 8 with the holder 16 holding the spent rod 6 down the inclined surface until it comes into contact with the mechanism 10. As the mechanism 10 reaches the holder 16 with the spent rod 6, its body 24 presses upon the head 20 of the rod 6, whereby the spring 21 is compressed and the rod 6 is forced into the holder 16 until the collet 17 engages with the encircling groove 19. As a result, another assembly 23 is produced and placed by the mechanism 10 in the compartment 15 of the spent assembly storage drum 12. At this point the recharging process is completed.

The recharging of fuel assemblies is carried out in a similar manner, with the exception of the operation of removing the new assembly from the holder and placing the spent assembly in this holder. However, the duration of both processes (the recharging of fuel assemblies and rods of the control and safety system) is equal, because the removal of a rod of the control and safety system from the holder and placing it in the holder are carried out simultaneously with the removal of this rod from or placing it in the respective socket of the core or compartment of the storage drum.

What is claimed is:

1. A device for recharging a core of a fast-neutron reactor, comprising a storage drum for new fuel assemblies and rods of a control and safety system; a storage drum for spent fuel assemblies and rods of the control and safety system, said storage drums having identical compartments for fuel assemblies and rods of the control and safety system; a recharging mechanism for placing new fuel assemblies and rods of the control and safety system in the core of said reactor and for removing spent fuel assemblies and rods therefrom, said recharging mechanism having a grip adapted to interact with heads of said fuel assemblies and rods by gripping the heads on the outside; a mechanism for transferring said fuel assemblies and rods from said storage drums to the recharging mechanism and vice versa; a set of sleeve-type holders having one end open for receiving said rods of the control and safety system, so that when placed in such a holder, the dimensions of the combination of the holder and the rod of the control and safety system are equal to those of a fuel assembly; a collet mounted on the open end of each of said sleeve-type holders; each of the rods having a profiled head and an encircling groove provided on a surface of each of said rods of the control and safety system, near its profiled head, for joining said rod with said holder by means of said collet which interacts with said groove; said grip having a stop adapted to interact with said collet to unclamp the latter from said rod; and spring means arranged in said holder for pressing against the rod in an axial direction in order to remove said rod from said holder.

2. A system for recharging a core of a fast-neutron reactor with new fuel assemblies and rods of a control and safety system comprising:

a set of sleeve-type holders having one end open for receiving rods of the control and safety system, each of said holders having holding means for releasably holding a rod in said holder, the releasably held rod and holder forming a combined assembly having external dimensions substantially equal to the external dimensions of a fuel assembly;

a storage drum for new fuel assemblies and combined assemblies;

a storage drum for spent fuel assemblies and combined assemblies, said storage drums having identical compartments for fuel assemblies and combined assemblies;

a recharging mechanism for placing new fuel assemblies and rods of the control and safety system in the core of said reactor and for removing spent fuel assemblies and rods therefrom, said recharging mechanism having grip means for gripping heads of said fuel assemblies and rods on the outside, and means for releasing said holding means of said holders from said rods so that said rods can be removed from said holders by said recharging mechanism and transferred to the core of the reactor; and means for transferring said holders and said combined assemblies between said recharging mechanism and said drums.

* * * * *